(12) United States Patent
Levine

(10) Patent No.: US 12,050,736 B2
(45) Date of Patent: Jul. 30, 2024

(54) HINGED BODY ASSEMBLY AND USER INTERFACE APPARATUS COMPRISING SAME

(71) Applicant: Xebec, Inc, Austin, TX (US)

(72) Inventor: Alex Levine, Austin, TX (US)

(73) Assignee: XEBEC, Inc., Austin, TX (US)

( * ) Notice: Subject to any disclaimer, the term of this patent is extended or adjusted under 35 U.S.C. 154(b) by 247 days.

(21) Appl. No.: 17/700,971

(22) Filed: Mar. 22, 2022

(65) Prior Publication Data

US 2023/0305639 A1    Sep. 28, 2023

(51) Int. Cl.
G06F 1/16    (2006.01)
G06F 3/02    (2006.01)
H02J 7/00    (2006.01)

(52) U.S. Cl.
CPC .......... *G06F 3/0208* (2013.01); *H02J 7/0042* (2013.01)

(58) Field of Classification Search
CPC .............................. G06F 3/0208; H02J 7/0042
See application file for complete search history.

(56) References Cited

U.S. PATENT DOCUMENTS

| | | | | |
|---|---|---|---|---|
| 4,113,212 A | * | 9/1978 | Coriden | G06F 15/0216 248/688 |
| 4,527,149 A | | 7/1985 | Swensen | |
| 4,592,528 A | * | 6/1986 | Still | G06F 3/0208 248/456 |
| 4,610,415 A | * | 9/1986 | Miller | B41J 5/105 108/1 |
| 4,773,783 A | * | 9/1988 | Dickie | G06F 3/0208 400/681 |
| 4,856,748 A | * | 8/1989 | Obermeyer | G06F 3/0208 248/676 |
| 4,980,676 A | * | 12/1990 | Nomura | G06F 1/1616 361/679.2 |
| 6,147,858 A | * | 11/2000 | Takahashi | G06F 3/0202 708/142 |
| 6,262,881 B1 | * | 7/2001 | Karidis | G06F 1/1666 400/489 |
| 6,370,018 B1 | * | 4/2002 | Miller, Jr. | H04M 1/23 345/169 |

(Continued)

OTHER PUBLICATIONS https://www.lenovo.com/us/en/p/tablets/android-tablets/yoga-tab-3-series/yoga-tab-3-pro/zzitztbyt1f?orgRef=https%253A%252F%252Fwww.google.com%252F.
https://www.amazon.com/ZAGG-Foldable-Wireless-Universal-Smartphones/dp/B00VY90WI6.

*Primary Examiner* — Jason W San
(74) *Attorney, Agent, or Firm* — David O. Simmons; IVC Patent Agency

(57) ABSTRACT

User interface apparatuses include a main body having a hinge portion integral with a long-edge at a top edge portion of the main body and a support body having a hinge portion integral with a long-edge at a bottom edge portion of the support body. The hinge portion of the support body is engaged with the hinge portion of the main body for enabling the support body to be pivoted between an in-plane orientation and a deployed orientation relative to the main body. Top and bottom surfaces of the support body each lay one of on and inboard of a reference plane defined by a respective one of a top surface and a bottom surface of the main body when the support body is in the in-plane orientation with respect to the main body. An overall thickness of the main body and the support body is preferably about the same.

9 Claims, 4 Drawing Sheets

(56) References Cited

U.S. PATENT DOCUMENTS

| | | | | |
|---|---|---|---|---|
| 6,808,326 B2* | 10/2004 | Klimke | G06F 3/0208 400/693 |
| 7,035,089 B2* | 4/2006 | Chuang | G06F 1/1666 400/489 |
| 7,187,537 B2* | 3/2007 | Liao | G06F 1/1667 361/679.09 |
| 7,393,151 B1* | 7/2008 | Miller, Jr. | G06F 3/0221 400/472 |
| 7,477,508 B1* | 1/2009 | Pilkington | H01H 13/86 361/679.09 |
| 7,652,874 B2* | 1/2010 | Loughnanae | G06F 3/0208 361/679.08 |
| 9,075,564 B2* | 7/2015 | Zhao | G06F 1/1667 |
| 10,761,571 B1* | 9/2020 | Cooper | E05D 11/08 |
| 10,983,570 B1* | 4/2021 | Files | G06F 3/04886 |
| 11,089,866 B2* | 8/2021 | Huang | F16M 11/048 |
| 2002/0034063 A1* | 3/2002 | Miller, Jr. | G06F 3/0213 361/679.08 |
| 2002/0164187 A1* | 11/2002 | Huang | H01H 13/86 400/472 |
| 2004/0012918 A1* | 1/2004 | Chen | G06F 1/1616 361/679.11 |
| 2010/0039759 A1* | 2/2010 | Yang | G06F 3/0213 361/679.08 |
| 2012/0176741 A1* | 7/2012 | Wu | G06F 1/1686 361/679.28 |
| 2013/0308263 A1* | 11/2013 | Dondurur | G06F 1/1667 361/679.12 |
| 2013/0335003 A1* | 12/2013 | Buhler | H02J 7/0042 320/103 |
| 2016/0062394 A1* | 3/2016 | Zhang | G06F 1/1618 361/679.55 |
| 2023/0208210 A1* | 6/2023 | Sultenfuss | H02J 50/90 320/109 |
| 2023/0300232 A1* | 9/2023 | Krasnoff | G06F 1/166 455/557 |

* cited by examiner

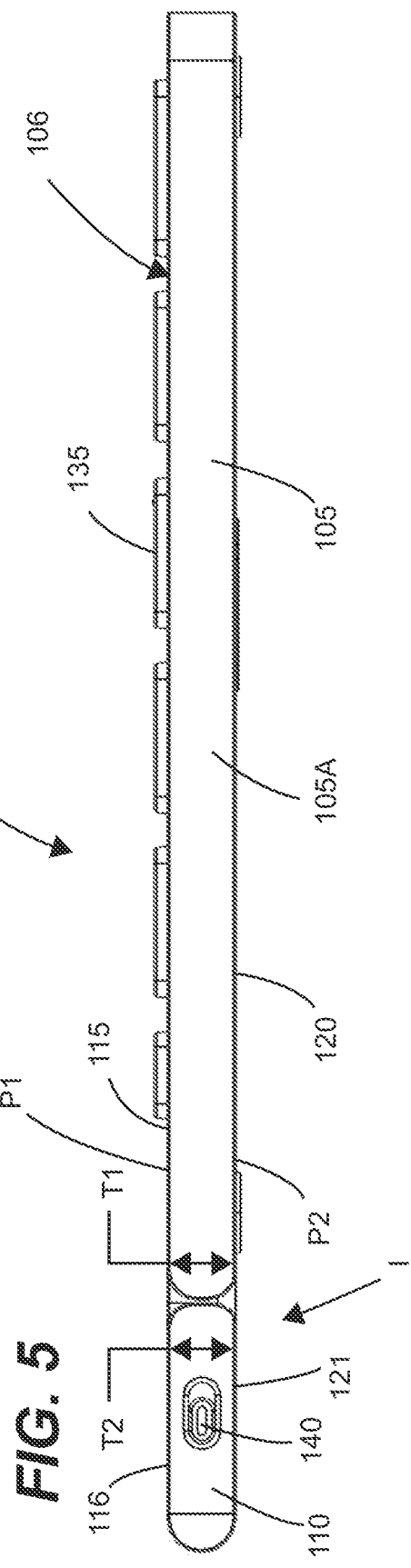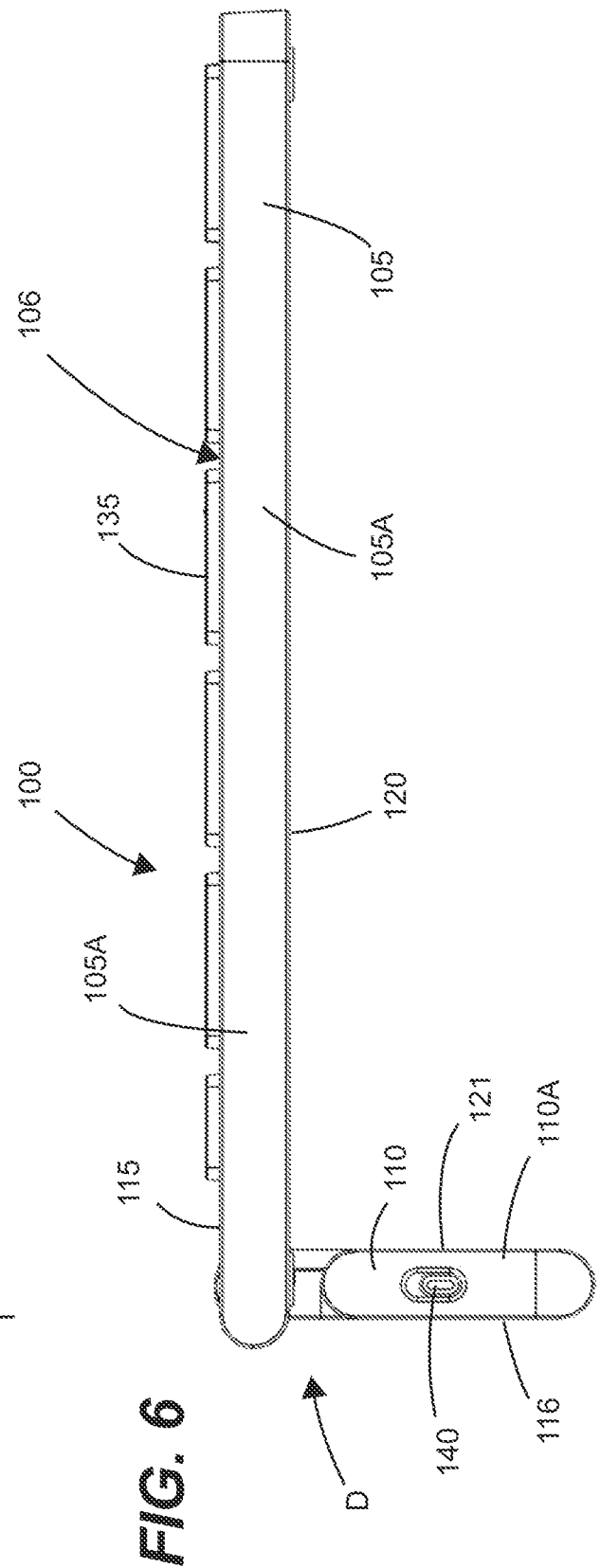

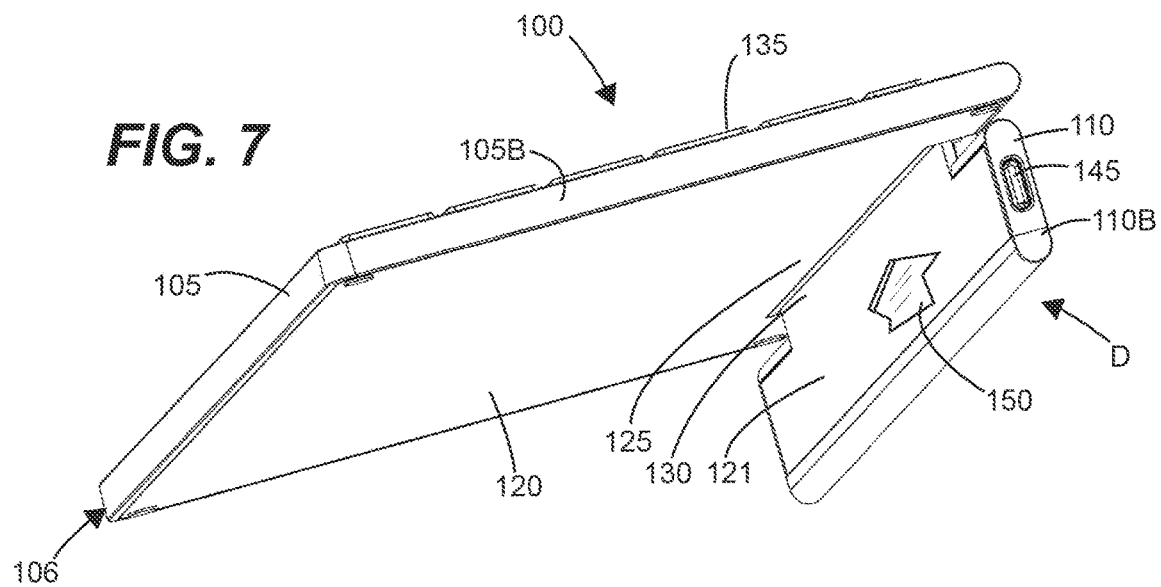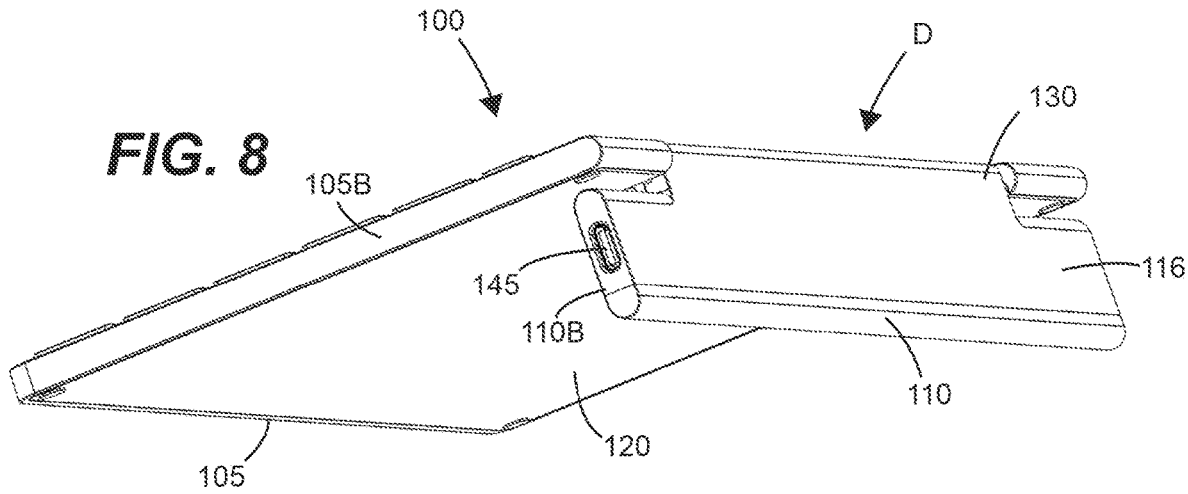

HINGED BODY ASSEMBLY AND USER INTERFACE APPARATUS COMPRISING SAME

FIELD OF THE DISCLOSURE

The disclosures made herein relate generally to user interface apparatuses in the form of, for example, consumer electronic devices and, more particularly, to hinged body assemblies including a main body having a support body pivotably attached thereto for enabling the support body to be used for supporting the main body in a tilted orientation relative to an underlying support surface.

BACKGROUND

It is well-known that, when typing on a keyboard (or other similar configuration of user interface apparatus) for any extended length of time, it is generally more comfortable to have the keyboard angled more than a few degrees so that the hands can be placed in a more relaxed position. For example, it is also well known that many keyboards include one or more support bodies (e.g., a leg sometimes referred to as a kickstand) at the back of the keyboard. The one or more support bodies are each movable between a deployed position and a retracted position relative to a main body of the keyboard. When in their deployed position, the one or more support bodies enable the keyboard to be supported with its rear edge in an elevated position when placed atop an underlying support surface desk (e.g., a desk or other worksurface) such that the keyboard is at a more comfortable tilted working orientation for the user. When in their retracted position, the one or more support bodies lay in a position that promotes storage and transport of the keyboard—e.g., flush with, within or laying on top of a back surface of the keyboard.

It is becoming common practice with the widespread use of computers, tablets and the like for such devices be designed in a manner to promote a low-profile configuration. Such a low-profile configuration is particularly beneficial when there are space constraints involved, whether in use or in storage. Conventional keyboards generally achieve such a low-profile configuration by stowing the one or more support bodies either flush against a bottom surface of the keyboard or in a recessed space within the bottom surface of the keyboard. Support bodies stowed in this fashion are known to exhibit drawbacks that include, but are not limited to, being cumbersome to operate, having movement mechanisms which are expensive to manufacture and/or are prone to fail, being limited to less than flush stowing, exhibiting less than full retraction, occupying space otherwise useful for housing of operational components of the keyboard and the like. Not only do these drawbacks result in less than desired low-profile attributes, but they also often limit the ability to reduce the overall thickness of the keyboard.

Therefore, user interface apparatuses having a main body configuration and configuration of support body(ies) that overcomes drawbacks of conventional types of user interface apparatuses that adversely impact their ability to exhibit a low-profile and minimal thickness would be advantageous, desirable and useful.

SUMMARY OF THE DISCLOSURE

Embodiments of the disclosures are directed to user interface apparatuses having a main body configuration and configuration of support body(ies) that overcomes drawbacks of conventional types of user interface apparatuses that adversely impact their ability to exhibit a low-profile and minimal thickness. Keyboards, tablets, and the like are examples of such user interface apparatuses. More specifically, embodiments of the disclosures made herein are directed to hinged body assemblies including a main body having a support body pivotably attached thereto for enabling the support body to be retain the main body in a tilted orientation relative to an underlying support surface.

Advantageously, support bodies of user interface apparatuses in accordance with the disclosures made herein preferably exhibit one of several distinguishing attributes. One such attribute is that such a support body may have a thickness and long-edge that is nominally or exactly the same as that of the main body. Another such attribute is that such a support body may be pivotably attached along its long-edge to the main body's long-edge to permit pivoting between an in-plane orientation with the main body for enabling flat storage/use and an angled orientation with the main body for enabling the main body to be supported in the aforementioned tilted use configuration. Yet another such attribute is that such a support body may have built-in ancillary functionality—e.g., power control switch, charging port, USB port, thumb-drive storage, etc.

In one or more embodiments of the disclosures made herein, a hinged body assembly comprises a main body and a support body. The main body has a hinge portion integral with an edge thereof. The support body has a hinge portion thereof integral with an edge thereof. The hinge portion of the support body is engaged with the hinge portion of the main body for enabling the support body to be pivotable between an in-plane orientation and a deployed orientation relative to the main body. A top surface and a bottom surface of the support body each lay one of on and inboard of a respective reference plane defined by a corresponding one of a top surface and a bottom surface of the main body when the support body is in the in-plane orientation.

In one or more embodiments of the disclosures made herein, a user interface apparatus comprises a main body and a support body. The main body has a hinge portion integral with a long-edge at a top edge portion of the main body. The support body has a hinge portion integral with a long-edge at a bottom edge portion of the support body. The hinge portion of the support body is engaged with the hinge portion of the main body for enabling the support body to be pivoted between an in-plane orientation and a deployed orientation relative to the main body. An overall thickness of the support body is approximately the same as an overall thickness of the main body. A power switch and a charging port are mounted within an interior space of the support body.

In one or more embodiments of the disclosures made herein, a keyboard comprises a key housing and a support body. The key housing has generally flat top and bottom surfaces. The support body has generally flat top and bottom surfaces. The support body is pivotably attached at a bottom edge portion thereof to a top edge portion of the key housing for enabling the support body to be moved between an in-plane orientation and a deployed orientation relative to the key housing. An overall thickness of the support body is approximately the same as an overall thickness of the key housing. The top and bottom surfaces of the support body each lay on a respective reference plane defined by a corresponding one of the top surface and the bottom surface of the key housing when the support body is in the in-plane orientation.

In one or more embodiments, each opposing end face of the support body is generally aligned with a respective one of opposing end faces of the main body such that an overall width of the support body is approximately the same as an overall width of the main body.

In one or more embodiments, the hinge portion of the main body and the hinge portion of the support body are centrally located between opposing end faces of the main body.

In one or more embodiments, an upper surface of a key housing of the main body defines the top surface of the main body.

In one or more embodiments, an overall thickness of the support body is approximately the same as a base thickness of the main body.

In one or more embodiments, the main body includes a plurality of selection keys and a key housing to which the selection keys are attached, the selection keys are exposed at a top surface of the key housing, the top surface of the key housing defines an upper reference plane of the main body, a rear surface of the main body defines a lower reference plane of the main body and a base thickness of the main body is equal to an offset distance between the upper and lower reference planes.

In one or more embodiments, an overall thickness of the support body is approximately the same as an overall thickness of the key housing.

In one or more embodiments, a power switch, a charging port or both are mounted within an interior space of the support body.

In one or more embodiments, the power switch, the charging port or both is accessible through an opening within an end face of the support body.

In one or more embodiments, the power switch is accessible through an opening within a first end face of the support body and the charging port is accessible through an opening within a second end face of the support body.

These and other objects, embodiments, advantages and/or distinctions of the present invention will become readily apparent upon further review of the following specification, associated drawings and appended claims.

BRIEF DESCRIPTION OF THE DRAWINGS

FIG. 5 is an end view of the user interface apparatus shown in FIG. 1, where the support body is in the in-plane orientation;

FIG. 6 is an end view of the user interface apparatus shown in FIG. 1, where the support body is in a deployed orientation with respect to the main body;

FIG. 7 is a fourth perspective bottom view of the user interface apparatus shown in FIG. 1, where the support body is in the deployed orientation; and FIG. 8 is a fifth perspective bottom view of the user interface apparatus shown in FIG. 1, where the support body is in the deployed orientation.

DETAILED DESCRIPTION

Figure 1:
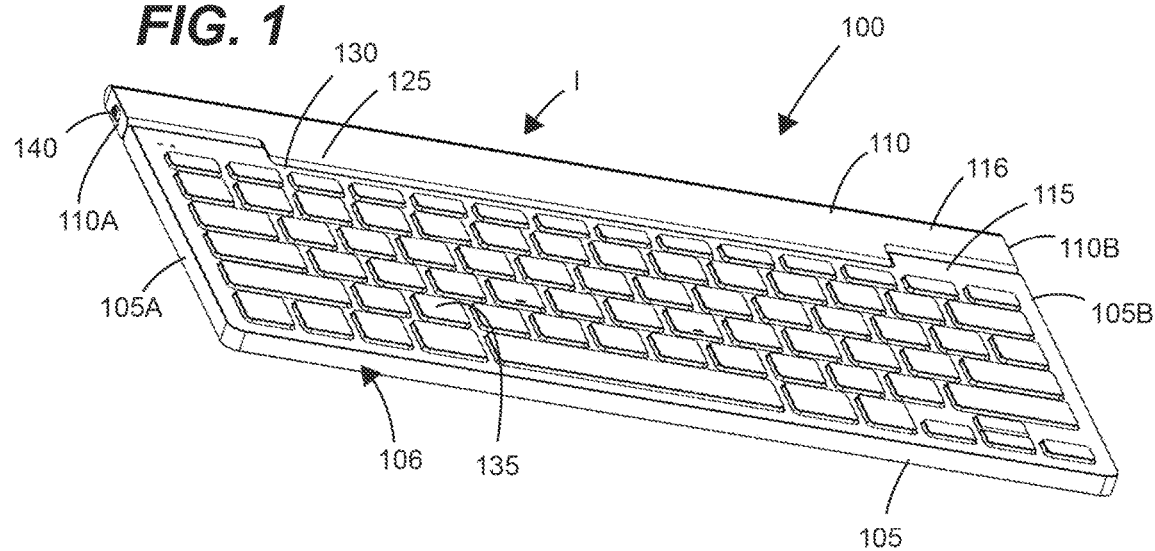
FIG. 1 is a first perspective view of a user interface apparatus in accordance with one or more embodiments of the disclosures made herein, where a support body of the user interface apparatus is in an in-plane orientation with respect to a main body of the user interface apparatus.
Figure 2:
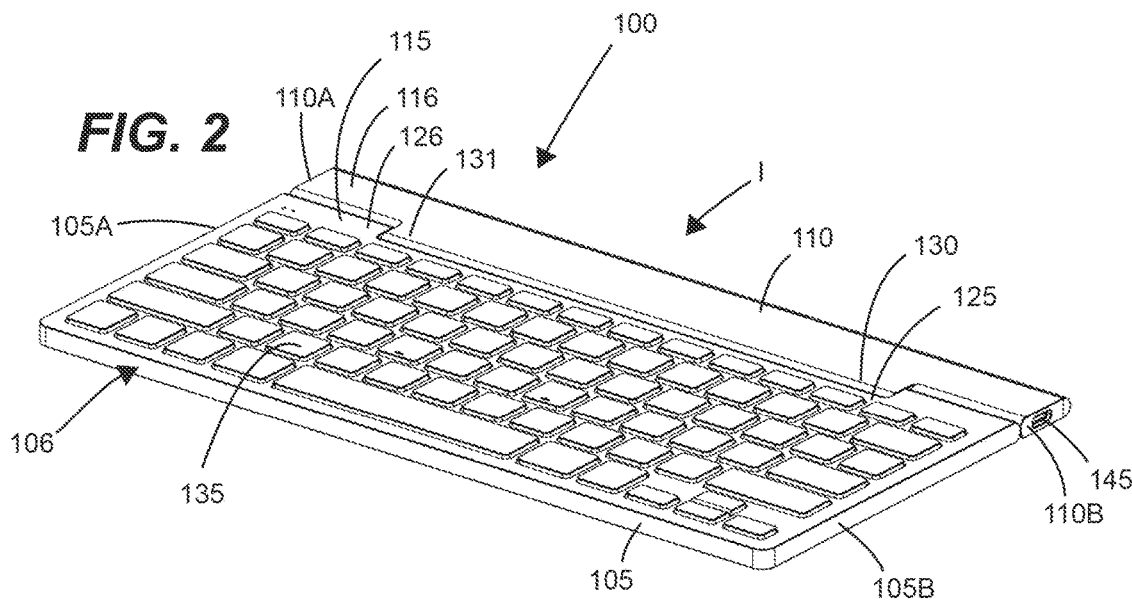
FIG. 2 is a second perspective view of the user interface apparatus shown in FIG. 1, where the support body is in the in-plane orientation.
Figure 3:
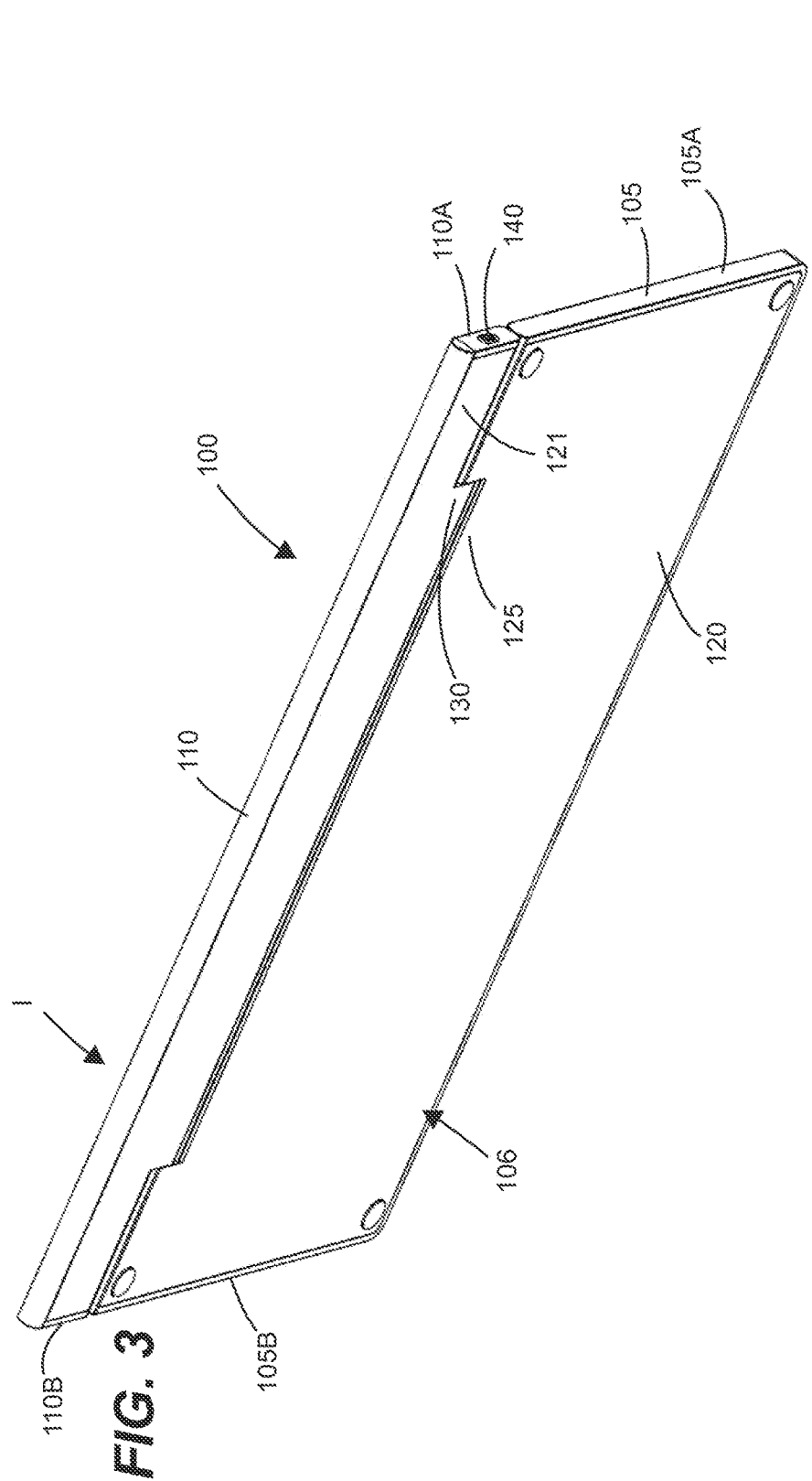
FIG. 3 is a third perspective view of the user interface apparatus shown in FIG. 1, where the support body is in the in-plane orientation.
Figure 4:
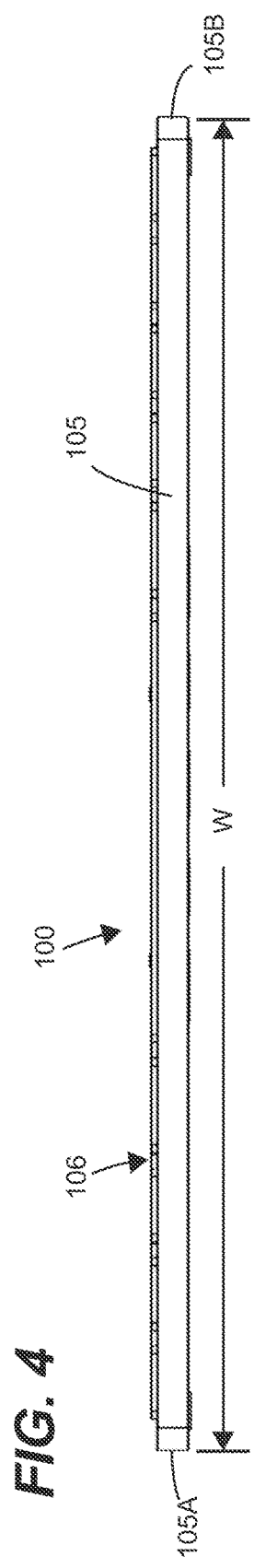
FIG. 4 is a top edge view of the user interface apparatus shown in FIG. 1, where the support body is in the in-plane orientation.

FIGS. 1-8 show various aspects of a keyboard configured in accordance with one of more embodiments of the disclosures made herein (i.e., keyboard 100). The keyboard 100 is an example of a user interface apparatus beneficially configurable in accordance with the disclosures made herein. Beneficially, the keyboard 100 includes a hinged body assembly comprising a main body having a support body pivotably attached thereto for enabling the support body to be used for supporting the main body in a tilted orientation relative to an underlying support surface.

As shown, the keyboard 100 comprises a key housing 105 and a support body 110. The key housing 105 has a generally flat top surface 115 and bottom surface 120. The support body 110 has a generally flat top surface 116 and bottom surface 121. In preferred embodiments, the top and bottom surfaces of the key housing 105 and the support body 110 are substantially or generally flat over all or a substantial portion thereof. A top edge portion 125 of the key housing 105 is pivotably attached to a bottom edge portion 130 of the support body 110 for enabling the support body 110 to be moved between an in-plane orientation I and a deployed orientation D relative to the key housing 105. Preferably, the support body 110 is pivoted at least about 90 degrees for being moved from the in-plane orientation I to the deployed orientation D.

In one or more embodiments, a hinge portion 126 of the main body 105 may be located adjacent to the top edge portion 125 of the key housing 105 and a hinge portion 131 of the support body 110 may be located adjacent to the bottom edge portion 130 of the key housing 105. Preferably, hinge portions 126, 131 may be centrally located between the opposing end faces 105A, 105B of the main body 105. A suitable mechanism may be incorporated into the key housing 105 and/or the support body 110 for enabling the support body 110 to be secured in positions corresponding to at least the in-plane orientation I and the deployed orientation D. In one or more embodiments, the suitable mechanism may be configured for enabling the support body 110 to be secured in one or more positions between the in-plane orientation I and the deployed orientation D. A skilled person will be aware of hinge mechanisms that may be used within the hinge portions 126, 131 for enabling the support body 110 to be moved between the in-plane orientation I and the deployed orientation D.

In one or more embodiments, the bottom edge portion 130 of the support body 110 is at a long-edge of the support body 110 and the top edge portion 125 of the key housing 105 is at a long-edge of the key housing 105. Long edge is herein defined to be one of the longer sides of a body having pairs of opposing sides of different length (e.g., a rectangle). In one or more embodiments, opposing end faces 110A, 110B of the support body 110 are each generally aligned with a respective one of the opposing end faces 105A, 105B of the main body 105 such that an overall width of the support body 110 is approximately the same as an overall width of the main body 105.

In some embodiments (e.g., a keyboard having mechanical keys), a plurality of selection keys 135 are attached to the key housing 105. The selection keys 135 and the key housing 105 jointly define a main body 106. The selection keys 135 are exposed at the top surface 115 of the key housing 105. In some other embodiments, the main body 106 excludes selection keys and user interfacing is provided for via a device such as a touchscreen visual display—e.g., a user interface apparatus in the form of a tablet.

Preferably, an overall thickness T1 of the key housing 105 (including the hinge portion thereof) is approximately the same as an overall thickness T2 of the support body 110 (including the hinge portion thereof), as best shown in FIG. 5. To this end, the top and bottom surfaces 116, 121 of the support body 110 each lay on a respective reference plane (upper reference plane P1, lower reference plane P2) defined by a respective one of the top surface and the bottom surface 115, 120 of the key housing 105 when the support body 110 is in the in-plane orientation I with respect to the key housing 105. In this regard, the overall thickness of the key housing 110 is a base thickness of the main body 106—i.e., the base thickness of the main body 106 is equal to an offset distance between the upper reference plane P1 and the lower reference plane P2.

In some embodiments, the overall thickness of the support body 110 may be the same or approximately the same as an overall thickness of the main body 106—i.e., an offset distance between a reference plane on which a top surface of at least a portion of the selection keys 136 reside and the lower reference plane P2 or, where there are no selection keys (or other raised used interface elements), an offset distance between upper and lower reference planes P1, P2 of the main body 106. In preferred embodiments, a top surface of each selection key 135 resides on a common reference plane that extends generally parallel with the upper reference plane P1 and the lower reference plane P2.

In one or more embodiments, a power switch 140, a charging port 145, a battery 150, or any combination thereof may be mounted on the support body 110 (e.g., within an interior space of the support body 110). The power switch 140, the charging port 145 and the battery 150 are utilized for enabling electrical power to be selectively supplied to electric components of the keyboard 100. Advantageously, mounting one or more of the aforementioned apparatus elements on the support body 110 enables beneficial utilization of available space of the support body 110 for these apparatus elements such as to, for example, to allow the surface area of the key housing to be reduced accordingly, to add weight to the support body 110 for aiding in stabilization of the keyboard 100 or the like.

In one or more embodiments, the power switch 140 and the charging port 145 are each accessible through a respective opening within a surface the support body 110 (e.g., an end face thereof). For example, as shown, the power switch 140 may be accessible through an opening within a first end face of the support body 110 and the charging port 145 may be accessible through an opening within a second end face of the support body 110.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A hinged body assembly, comprising:
a main body having a hinge portion integral with an edge thereof, wherein a top surface of the main body defines a top reference plane of the main body and a bottom surface of the main body defines a bottom reference plane of the main body;
a support body having a hinge portion thereof integral with an edge thereof, wherein the hinge portion of the support body is engaged with the hinge portion of the main body for enabling the support body to be pivotable between an in-plane orientation and a deployed orientation relative to the main body, wherein an overall thickness of the support body is one of equal to and less than an offset distance between the top and bottom reference planes, wherein a rear edge of the support body is a support surface of the hinged body assembly for supporting the main body in a tilted orientation relative to an underlying support surface when the support body is in the deployed orientation, wherein said hinged engagement between the main body and the support body is the only operable engagement between either of said bodies and any other body, and wherein the support body includes an interior space; and
at least one power supply component located within the interior space of the support body, wherein the at least one power supply component includes a user interface portion accessible through an opening within an end face of the support body.

2. The hinged body assembly of claim 1 wherein each opposing end face of the support body is generally aligned with a respective one of the opposing end faces of the main body such that an overall width of the support body is approximately the same as an overall width of the main body.

3. The hinged body assembly of claim 2 wherein the hinge portion of the main body and the hinge portion of the support body are centrally located between the opposing end faces of the main body.

4. The hinged body assembly of claim 1 wherein an upper surface of a key housing of the main body defines the top surface of the main body.

5. The hinged body assembly of claim 1 wherein:
the main body includes a plurality of selection keys attached to the key housing;
the selection keys are exposed at the top surface of the key housing; and
a top surface of one or more of the selection keys defines the top surface of the main body.

6. The hinged body assembly of claim 5 wherein the at least one power supply component includes at least one of a power switch and a charging port.

7. The hinged body assembly of claim 1 wherein:
the main body includes a plurality of selection keys attached to a key housing;
a base thickness of the main body is equal to an offset distance between top and bottom surfaces of the key housing; and
an overall thickness of the support body is approximately the same as the base thickness of the main body.

8. The hinged body assembly of claim 1 wherein the at least one power supply component includes all of a battery, a power switch, and a charging port.

9. The hinged body assembly of claim 1 wherein the at least one power supply component includes at least one of a power switch and a charging port.

* * * * *